US007994409B2

(12) United States Patent
Lemons

(10) Patent No.: US 7,994,409 B2
(45) Date of Patent: Aug. 9, 2011

(54) METHOD AND APPARATUS FOR EDITING AND MIXING SOUND RECORDINGS

(75) Inventor: Kenneth R. Lemons, Indianapolis, IN (US)

(73) Assignee: Master Key, LLC, Indianapolis, IN (US)

( * ) Notice: Subject to any disclaimer, the term of this patent is extended or adjusted under 35 U.S.C. 154(b) by 493 days.

(21) Appl. No.: 12/148,596

(22) Filed: Apr. 21, 2008

(65) Prior Publication Data

US 2008/0271589 A1 Nov. 6, 2008

Related U.S. Application Data

(60) Provisional application No. 60/912,796, filed on Apr. 19, 2007.

(51) Int. Cl.

| | |
|---|---|
| ***G06T 11/20*** | (2006.01) |
| ***G06T 13/00*** | (2011.01) |
| ***G09G 5/22*** | (2006.01) |
| ***A63J 17/00*** | (2006.01) |
| ***A63J 5/10*** | (2006.01) |
| ***G10H 1/00*** | (2006.01) |
| ***G09B 15/02*** | (2006.01) |
| ***G06F 17/00*** | (2006.01) |
| ***G10L 21/00*** | (2006.01) |

(52) U.S. Cl. .................. 84/464 R; 84/477 R; 84/483.2; 345/440; 345/441; 345/443; 345/473; 345/10; 345/22; 345/23; 700/94

(58) Field of Classification Search ................ 84/464 R, 84/464 A, 477 R, 478, 483.2; 700/94; 345/440, 345/440.1, 440.2, 441, 442, 443, 473, 10–24; 704/273

See application file for complete search history.

(56) References Cited

U.S. PATENT DOCUMENTS

| | | | |
|---|---|---|---|
| 347,686 | A | 8/1886 | Carpenter et al. |
| 2,804,500 | A | 8/1957 | Giacoletto |
| 3,698,277 | A | 10/1972 | Barra |
| 3,969,972 | A | 7/1976 | Bryant |
| 4,128,846 | A | 12/1978 | Robinson, Jr. |
| 4,172,406 | A | 10/1979 | Martinez |
| 4,257,062 | A | 3/1981 | Meredith |

(Continued)

FOREIGN PATENT DOCUMENTS

EP 0349686 A1 1/1990

(Continued)

OTHER PUBLICATIONS

"Time-line of the Music Animation Machine (and related experiments)", Music Animation Machine: History, htp://www.musanim.com/mam/mamhist.htm, pp. 1-5, p. 1, pp. 1-2, pp. 1-2 & p. 1, printed Aug. 30, 2007.

(Continued)

*Primary Examiner* — Jeffrey Donels
*Assistant Examiner* — Andrew R Millikin
(74) *Attorney, Agent, or Firm* — Woodard, Emhardt, Moriarty, McNett & Henry LLP

(57) ABSTRACT

The present disclosure relates to audio mixing and editing devices and methods. A system is provided that permits mixing of and editing of multiple input audio tracks through the use of visual representation of audio signals. By viewing the visual representations of the audio inputs, a user is able to achieve a desired mix of signals with more accuracy and efficiency when compared with mixing based on hearing alone.

8 Claims, 18 Drawing Sheets
(11 of 18 Drawing Sheet(s) Filed in Color)

U.S. PATENT DOCUMENTS

| | | | |
|---|---|---|---|
| 4,378,466 | A | 3/1983 | Esser |
| 4,526,168 | A | 7/1985 | Hassler et al. |
| 4,887,507 | A | 12/1989 | Shaw |
| 4,907,573 | A | 3/1990 | Nagasaki |
| 5,048,390 | A | 9/1991 | Adachi et al. |
| 5,207,214 | A | 5/1993 | Romano |
| 5,370,539 | A | 12/1994 | Dillard |
| 5,415,071 | A | 5/1995 | Davies |
| 5,563,358 | A | 10/1996 | Zimmerman |
| 5,741,990 | A | 4/1998 | Davies |
| 5,784,096 | A | 7/1998 | Paist |
| 6,031,172 | A | 2/2000 | Papadopoulos |
| 6,111,755 | A | 8/2000 | Park |
| 6,127,616 | A | 10/2000 | Yu |
| 6,137,041 | A | 10/2000 | Nakano |
| 6,201,769 | B1 | 3/2001 | Lewis |
| 6,245,981 | B1 | 6/2001 | Smith |
| 6,265,651 | B1 | 7/2001 | Landtroop |
| 6,350,942 | B1 | 2/2002 | Thomson |
| 6,390,923 | B1 | 5/2002 | Yoshitomi et al. |
| 6,392,131 | B2 | 5/2002 | Boyer |
| 6,407,323 | B1 | 6/2002 | Karapetian |
| 6,411,289 | B1 | 6/2002 | Zimmerman |
| 6,414,230 | B2 | 7/2002 | Randall |
| 6,448,487 | B1 | 9/2002 | Smith |
| 6,544,123 | B1 | 4/2003 | Tanaka et al. |
| 6,686,529 | B2 | 2/2004 | Kim |
| 6,750,386 | B2 | 6/2004 | King |
| 6,791,568 | B2 | 9/2004 | Steinberg et al. |
| 6,841,724 | B2 | 1/2005 | George |
| 6,841,742 | B2 | 1/2005 | Shenholz et al. |
| 6,856,329 | B1 | 2/2005 | Peevers et al. |
| 6,927,331 | B2 | 8/2005 | Haase |
| 6,930,235 | B2 | 8/2005 | Sandborn et al. |
| 6,987,220 | B2 | 1/2006 | Holcome |
| 7,030,307 | B2 | 4/2006 | Wedel |
| 7,096,154 | B1 | 8/2006 | Andrade-Cetto |
| 7,153,139 | B2 | 12/2006 | Wen et al. |
| 7,182,601 | B2 | 2/2007 | Donnan |
| 7,202,406 | B2 | 4/2007 | Coleman |
| 7,212,213 | B2 | 5/2007 | Steinberg et al. |
| 7,271,328 | B2 | 9/2007 | Pangrie |
| 7,271,329 | B2 | 9/2007 | Franzblau |
| 7,400,361 | B2 | 7/2008 | Noske et al. |
| 7,439,438 | B2 | 10/2008 | Hao |
| 7,521,619 | B2 | 4/2009 | Salter |
| 7,538,265 | B2 | 5/2009 | Lemons |
| 7,663,043 | B2 | 2/2010 | Park |
| 7,667,125 | B2 | 2/2010 | Taub et al. |
| 7,714,222 | B2 | 5/2010 | Taub et al. |
| 2002/0050206 | A1 | 5/2002 | MacCutcheon |
| 2002/0176591 | A1 | 11/2002 | Sandborn et al. |
| 2003/0205124 | A1 | 11/2003 | Foote et al. |
| 2004/0089132 | A1 | 5/2004 | Georges et al. |
| 2004/0148575 | A1 | 7/2004 | Haase |
| 2004/0206225 | A1 | 10/2004 | Wedel |
| 2005/0190199 | A1 | 9/2005 | Brown et al. |
| 2005/0241465 | A1 | 11/2005 | Goto |
| 2006/0107819 | A1 | 5/2006 | Salter |
| 2006/0132714 | A1 | 6/2006 | Nease et al. |
| 2007/0044639 | A1 | 3/2007 | Farbood et al. |
| 2007/0157795 | A1 | 7/2007 | Hung |
| 2007/0180979 | A1 | 8/2007 | Rosenberg |
| 2008/0022842 | A1 | 1/2008 | Lemons |
| 2008/0034947 | A1 | 2/2008 | Sumita |
| 2008/0115656 | A1 | 5/2008 | Sumita |
| 2008/0190271 | A1 | 8/2008 | Taub et al. |
| 2008/0245212 | A1 | 10/2008 | Lemons |
| 2008/0264239 | A1 | 10/2008 | Lemons et al. |
| 2008/0271589 | A1 | 11/2008 | Lemons |
| 2008/0271590 | A1 | 11/2008 | Lemons |
| 2008/0271591 | A1 | 11/2008 | Lemons |
| 2008/0276790 | A1 | 11/2008 | Lemons |
| 2008/0276791 | A1 | 11/2008 | Lemons |
| 2008/0276793 | A1 | 11/2008 | Yamashita et al. |
| 2008/0314228 | A1 | 12/2008 | Dreyfuss et al. |
| 2009/0223348 | A1 | 9/2009 | Lemons |
| 2010/0154619 | A1 | 6/2010 | Taub et al. |

FOREIGN PATENT DOCUMENTS

| | | | |
|---|---|---|---|
| EP | 456 860 | A1 | 11/1991 |
| EP | 1354561 | A1 | 10/2003 |
| JP | 05-232856 | | 9/1993 |
| JP | 2004-226556 | A | 8/2004 |
| KR | 10-2006-0110988 | | 10/2006 |

OTHER PUBLICATIONS

Ashton, Anthony, “Harmonograph: A Visual Guide to the Mathematics of Music,” ISBN 0-8027-1409-9, Walker Publishing Company, 2003, pp. 1-58.

Bourke, Paul, “Harmonograph,” Aug. 1999, http://local.wasp.uwa.edu.au/~pbourke/suraces_curves/harmonograph/, pp. 1-6, printed Aug. 30, 2007.

Dunne, Gabriel, “Color/Shape/Sound Ratio & Symmetry Calculator,” Quilime.com—Symmetry Calculator, https://www.quilime.com/content/colorcalc/, pp. 1-6, printed Jul. 3, 2007.

Patent Application Search Report mailed Aug. 14, 2008 for PCT/US2008/004989.

Patent Application Search Report mailed on Aug. 1, 2008 for PCT/US2008/59126.

Patent Application Search Report mailed on Aug. 18, 2008 for PCT/US 2008/05073.

Patent Application Search Report mailed on Aug. 18, 2008 for PCT/US2008/5126.

Patent Application Search Report mailed on Aug. 18, 208 for PCT/US2008/005069.

Patent Application Search Report mailed on Aug. 21, 2008 for PCT/US2008/005076.

Patent Application Search Report mailed on Aug. 27, 2008 for PCT/US2008/005075.

Patent Application Search Report mailed on Aug. 28, 2008 for PCT/US2008/005077.

Patent Application Search Report mailed on Jul. 31, 2008 for PCT/US2008/005070.

Patent Applicaton Search Report mailed on Sep. 18, 2008 for PCT/US2008/005072.

Patent Applicaton Search Report mailed on Sep. 18, 2008 for PCT/US2008/005124.

Patent Application Search Report mailed on Sep. 24, 2008 for PCT/US2008/005125.

Patent Application Search Report mailed on Sep. 29, 2008 for PCT/US2008/005074.

Rabiner, Huang, “Fundamentals of Speech Recognition,” PTR Prentice-Hall, Inc., 1993 ISBN 0-13-285826-6, pp. 21-31, 42-68; Fig.2.17, 2.32.

Patent Application Search Report mailed on Aug. 25, 2009 for PCT/US2009/000684.

Written Opinion mailed on Aug. 25, 2009 for PCT/US2009/00684.

METHOD AND APPARATUS FOR EDITING AND MIXING SOUND RECORDINGS

CROSS-REFERENCE TO RELATED APPLICATIONS

The present application claims the benefit of U.S. Provisional Patent Application Ser. No. 60/912,796, filed Apr. 19, 2007, entitled "Method and Apparatus for Editing and Mixing Sound Recordings." This application also relates to U.S. Provisional Patent Application Ser. No. 60/830,386 filed Jul. 12, 2006 entitled "Apparatus and Method for Visualizing Musical Notation", U.S. Utility patent application Ser. No. 11/827,264 filed Jul. 11, 2007 entitled "Apparatus and Method for Visualizing Music and Other Sounds", U.S. Provisional Patent Application Ser. No. 60/921,578, filed Apr. 3, 2007, entitled "Device and Method for Visualizing Musical Rhythmic Structures", and U.S. utility patent application Ser. No. 12/023,375 filed Jan. 31, 2008 entitled "Device and Method for Visualizing Musical Rhythmic Structures". All of these applications are hereby incorporated by reference in their entirety.

TECHNICAL FIELD OF THE DISCLOSURE

The present disclosure relates generally to sound recording and, more specifically, to a method and apparatus for editing and mixing sound recordings using analysis of tonal and rhythmic structures.

BACKGROUND OF THE DISCLOSURE

Sound or music recording studios often have multiple track recording equipment that is used to record specific instruments or vocal tracks, or to add tracks at a later time or that were recorded at a different location. A sound engineer will edit and mix the various recorded tracks to create the finished recording. This process is typically done by "ear" with the engineer being trained to edit and mix tracks, e.g., adjusting the volume or amplitude of one track vis-à-vis another track, based on listening to the mixed and edited result. Often remixing or reediting is necessary as the recorded tracks increase in number. The quality of the finished recording is therefore only as good as the expertise of the sound engineer. Methods are needed to improve the efficiency and quality of the editing and mixing process.

SUMMARY OF THE INVENTION

Accordingly, in one aspect, an audio mixing end editing system is disclosed, comprising a user input device, a processing device, and a display; wherein said processing device executes computer readable code to create a first visual representation of a first one of a plurality of input audio signals for output on said display; wherein said first visual representation is generated according to a method comprising the steps of: (a) labeling the perimeter of a circle with a plurality of labels corresponding to a plurality of frequency bands, such that moving radially inward or outward from any one of said labels represents a change in signal amplitude at the frequency corresponding to said one of first labels; (b) identifying a first occurrence a first frequency having a first amplitude within said first one of a plurality of input audio signals; and (c) graphically indicating a point along a radial axis corresponding to said first amplitude; said radial axis connecting the center of said circle and said first label.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
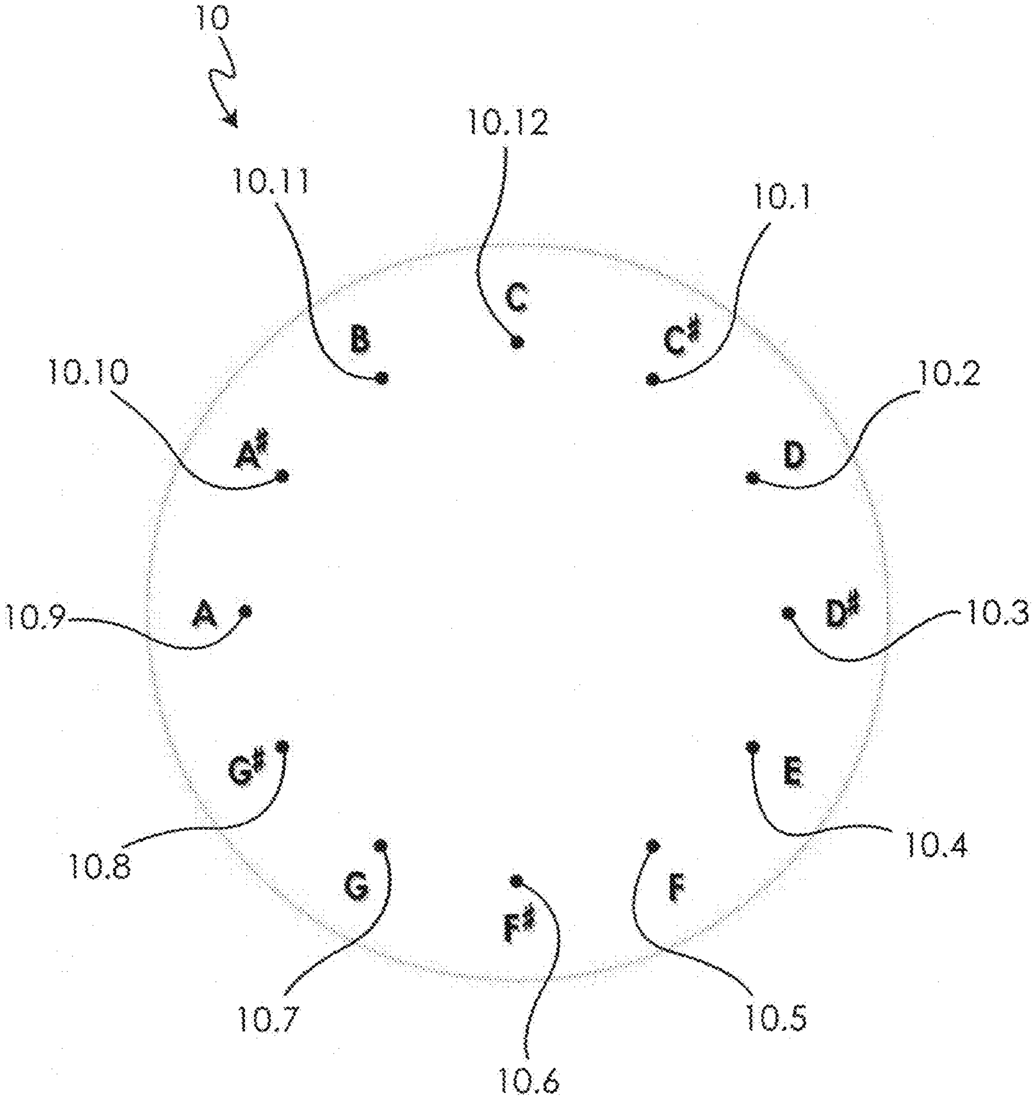
FIG. 1 is a diagram of a twelve-tone circle according to one embodiment.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Before describing the system and method for editing and mixing audio recordings, a summary of the above-referenced music tonal and rhythmic visualization methods will be presented. The tonal visualization methods are described in U.S. patent application Ser. No. 11/827,264 filed Jul. 11, 2007 entitled "Apparatus and Method for Visualizing Music and Other Sounds" which is hereby incorporated by reference in its entirety.

There are three traditional scales or 'patterns' of musical tone that have developed over the centuries. These three scales, each made up of seven notes, have become the foundation for virtually all musical education in the modern world. There are, of course, other scales, and it is possible to create any arbitrary pattern of notes that one may desire; but the vast majority of musical sound can still be traced back to these three primary scales.

Each of the three main scales is a lopsided conglomeration of seven intervals:

| | |
|---|---|
| Major scale: | 2 steps, 2 steps, 1 step, 2 steps, 2 steps, 2 steps, 1 step |
| Harmonic Minor Scale: | 2, 1, 2, 2, 1, 3, 1 |
| Melodic Minor Scale: | 2, 1, 2, 2, 2, 2, 1 |

Unfortunately, our traditional musical notation system has also been based upon the use of seven letters (or note names) to correspond with the seven notes of the scale: A, B, C, D, E, F and G. The problem is that, depending on which of the three scales one is using, there are actually twelve possible tones to choose from in the 'pool' of notes used by the three scales. Because of this discrepancy, the traditional system of musical notation has been inherently lopsided at its root.

With a circle of twelve tones and only seven note names, there are (of course) five missing note names. To compensate, the traditional system of music notation uses a somewhat arbitrary system of 'sharps' (♯'s) and 'flats' (♭'s) to cover the remaining five tones so that a single notation system can be used to encompass all three scales. For example, certain key signatures will have seven 'pure letter' tones (like 'A') in addition to sharp or flat tones (like C♯ or G♭), depending on the key signature. This leads to a complex system of reading and writing notes on a staff, where one has to mentally juggle a key signature with various accidentals (sharps and flats) that are then added one note at a time. The result is that the seven-note scale, which is a lopsided entity, is presented as a straight line on the traditional musical notation staff. On the other hand, truly symmetrical patterns (such as the chromatic scale) are represented in a lopsided manner on the traditional musical staff. All of this inefficiency stems from the inherent flaw of the traditional written system being based upon the seven note scales instead of the twelve-tone circle.

To overcome this inefficiency, a set of mathematically based, color-coded MASTER KEY™ diagrams is presented to better explain the theory and structures of music using geometric form and the color spectrum. As shown in FIG. 1, the twelve tone circle 10 is the template upon which all of the other diagrams are built. Twelve points 10.1-10.12 are geometrically placed in equal intervals around the perimeter of the circle 10 in the manner of a clock; twelve points, each thirty degrees apart. Each of the points 10.1-10.12 on the circle 10 represents one of the twelve pitches. The names of the various pitches can then be plotted around the circle 10. It will be appreciated that in traditional musical notation there are more than one name for each pitch (e.g., A♯ is the same as B♭), which causes inefficiency and confusion since each note can be 'spelled' in two different ways. In the illustrated embodiment, the circle 10 has retained these traditional labels, although the present disclosure comprehends that alternative labels can be used, such as the letters A-L, or numbers 1-12. Furthermore, the circle 10 of FIG. 1 uses the sharp notes as labels; however, it will be understood that some or all of these sharp notes can be labeled with their flat equivalents and that some of the non-sharp and non-flat notes can be labeled with the sharp or flat equivalents.

Figure 2:
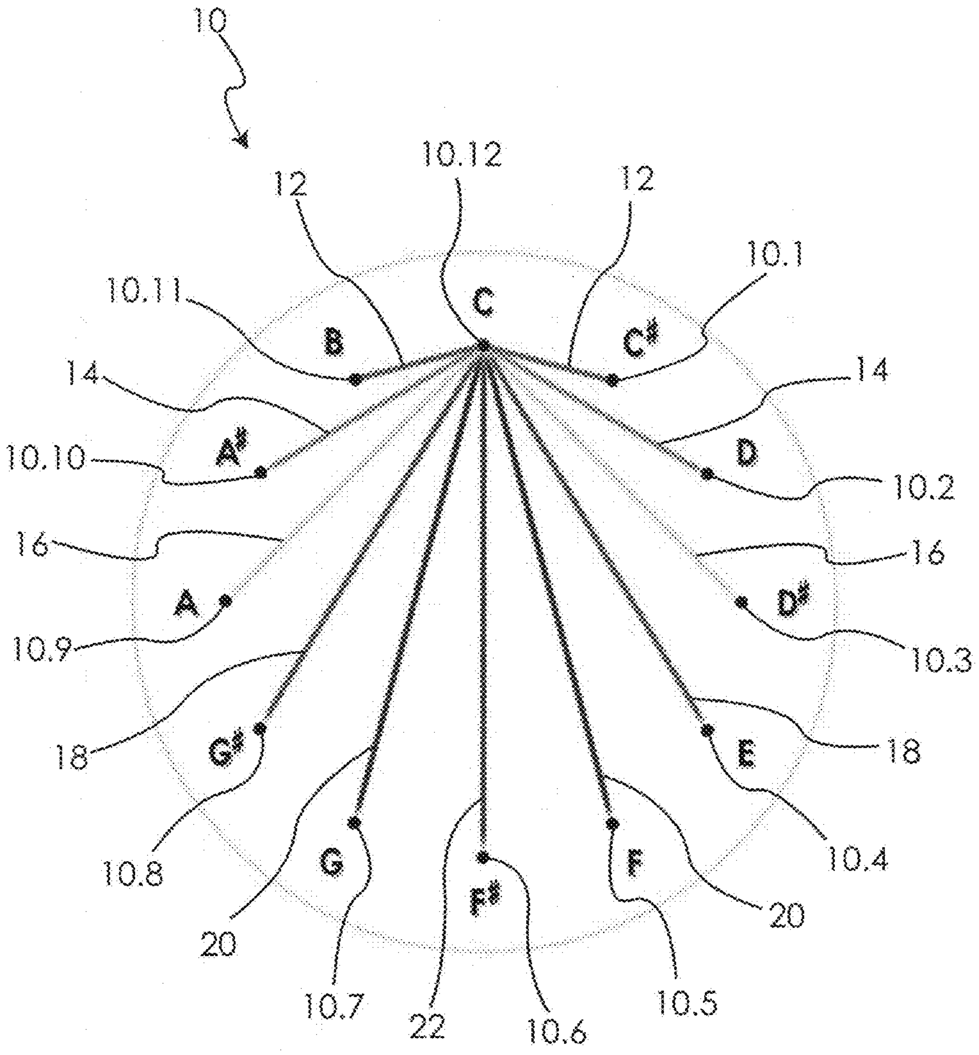
FIG. 2 is a diagram of a twelve-tone circle showing the six intervals.

The next 'generation' of the MASTER KEY™ diagrams involves thinking in terms of two note 'intervals.' The Interval diagram, shown in FIG. 2, is the second of the MASTER KEY™ diagrams, and is formed by connecting the top point 10.12 of the twelve-tone circle 10 to every other point 10.1-10.11. The ensuing lines—their relative length and color—represent the various 'intervals.' It shall be understood that while eleven intervals are illustrated in FIG. 2, there are actually only six basic intervals to consider. This is because any interval larger than the tri-tone (displayed in purple in FIG. 2) has a 'mirror' interval on the opposite side of the circle. For example, the whole-step interval between C (point 10.12) and D (point 10.2) is equal to that between C (point 10.12) and A♯ (point 10.10).

Another important aspect of the MASTER KEY™ diagrams is the use of color. Because there are six basic music intervals, the six basic colors of the rainbow can be used to provide another way to comprehend the basic structures of music. In a preferred embodiment, the interval line 12 for a half step is colored red, the interval line 14 for a whole step is colored orange, the interval line 16 for a minor third is colored yellow, the interval line 18 for a major third is colored green, the interval line 20 for a perfect fourth is colored blue, and the interval line 22 for a tri-tone is colored purple. In other embodiments, different color schemes may be employed. What is desirable is that there is a gradated color spectrum assigned to the intervals so that they may be distinguished from one another by the use of color, which the human eye can detect and process very quickly.

Figure 3:
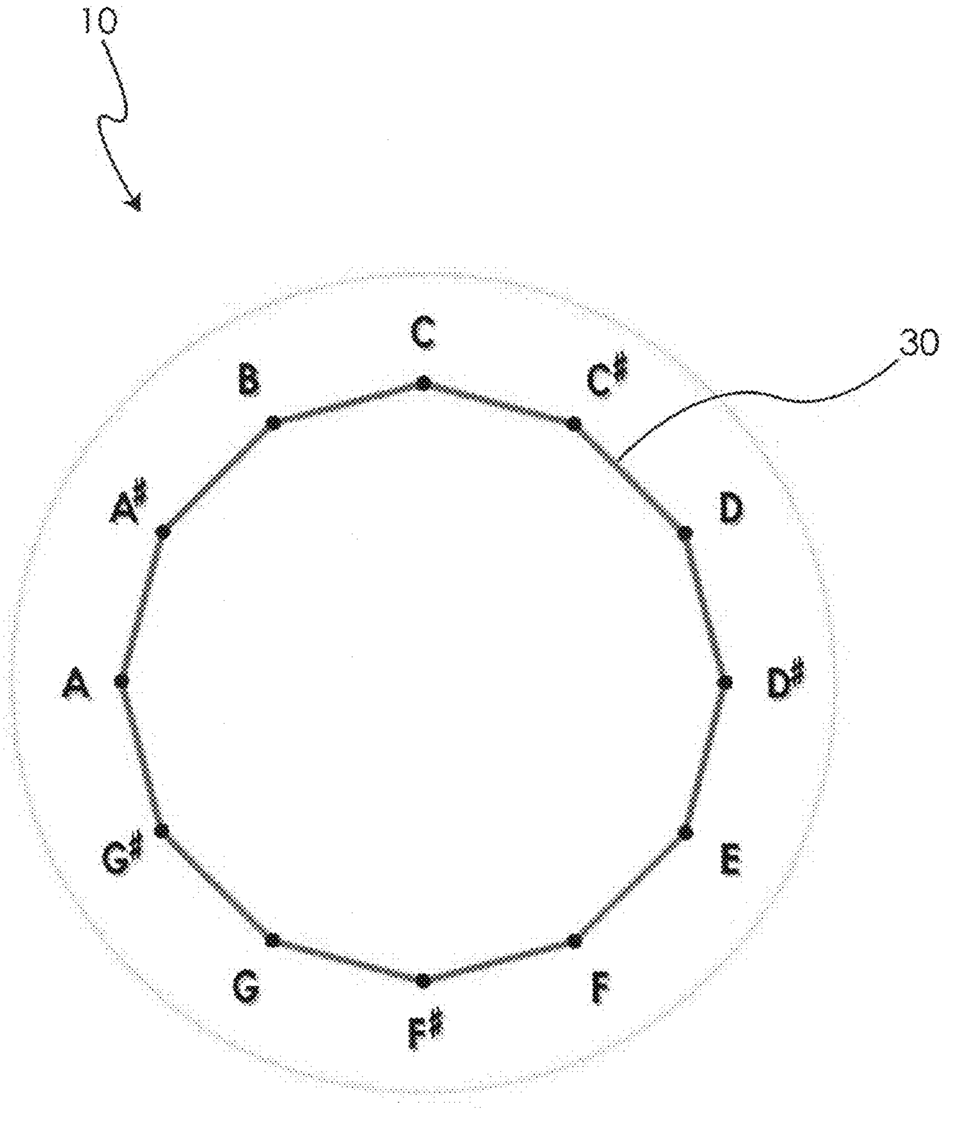
FIG. 3 is a diagram of a twelve-tone circle showing the chromatic scale.
Figure 4:
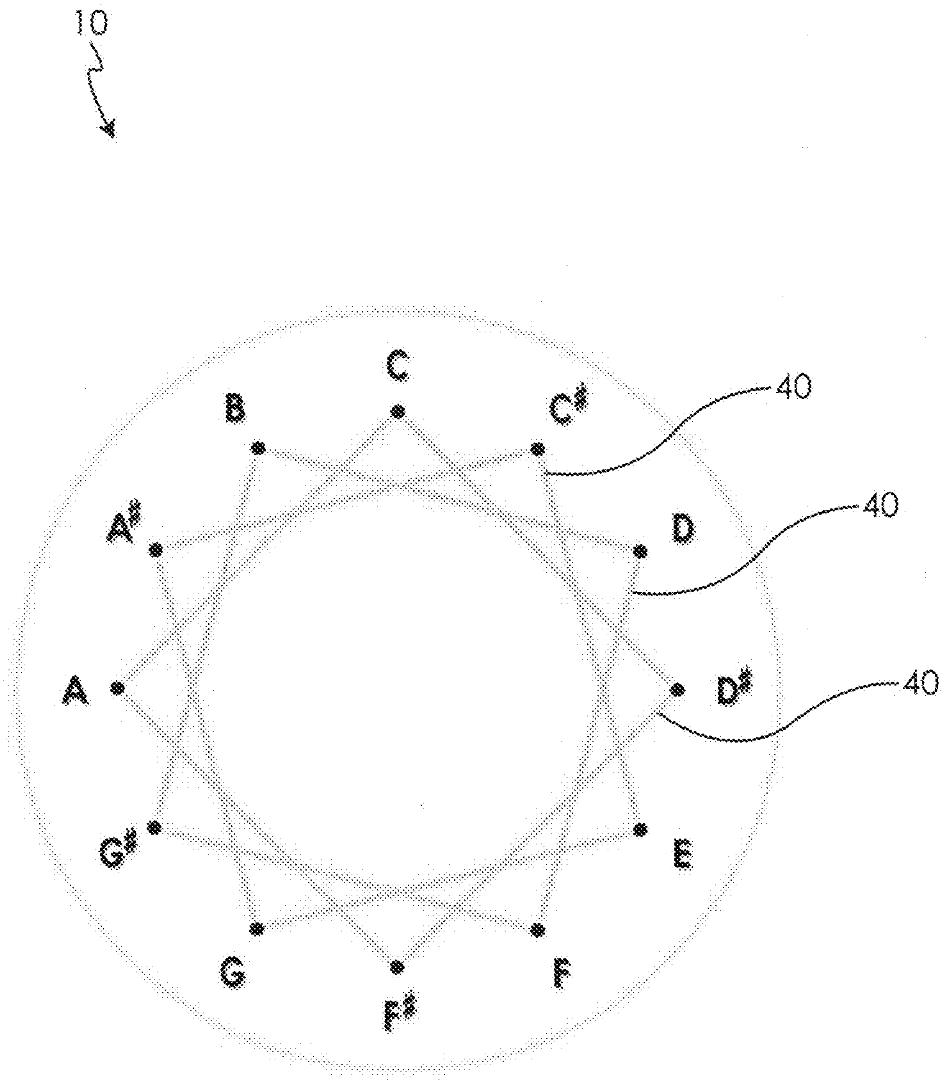
FIG. 4 is a diagram of a twelve-tone circle showing the first through third diminished scales.
Figure 5:
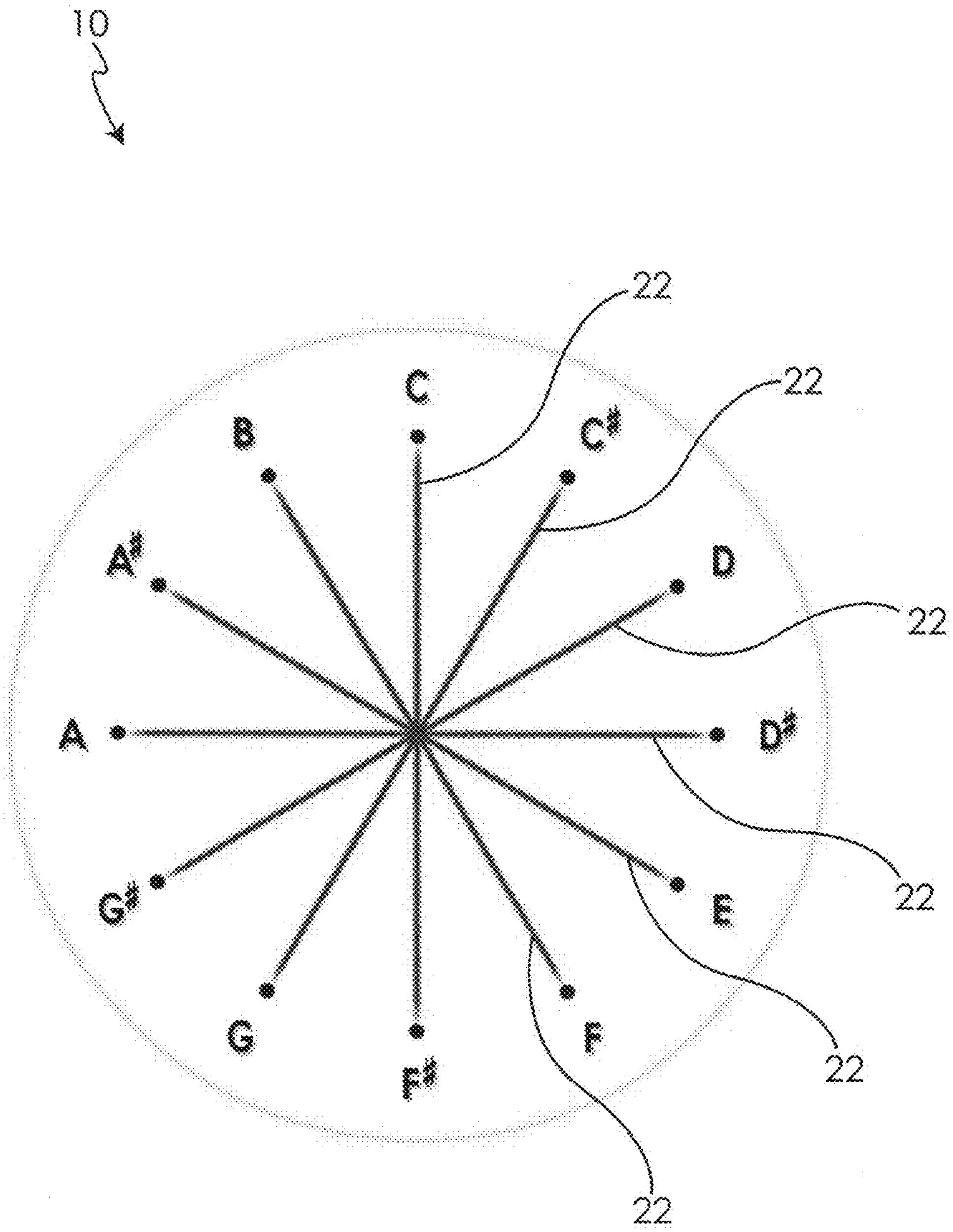
FIG. 5 is a diagram of a twelve-tone circle showing all six tri-tones.

The next group of MASTER KEY™ diagrams pertains to extending the various intervals 12-22 to their completion around the twelve-tone circle 10. This concept is illustrated in FIG. 3, which is the diagram of the chromatic scale. In these diagrams, each interval is the same color since all of the intervals are equal (in this case, a half-step). In the larger intervals, only a subset of the available tones is used to complete one trip around the circle. For example, the minor-third scale, which gives the sound of a diminished scale and forms the shape of a square 40, requires three transposed scales to fill all of the available tones, as illustrated in FIG. 4. The largest interval, the tri-tone, actually remains a two-note shape 22, with six intervals needed to complete the circle, as shown in FIG. 5.

Figure 6:
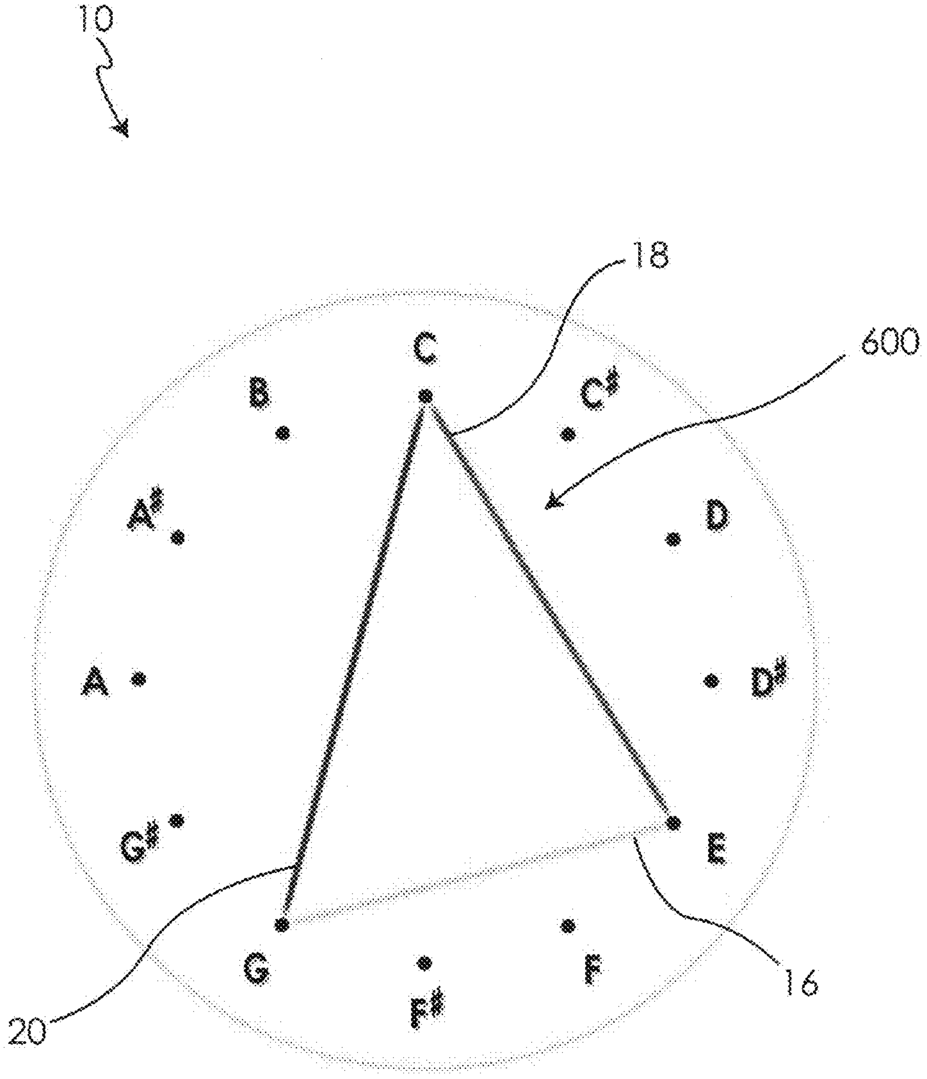
FIG. 6 is a diagram of a twelve-tone circle showing a major triad.

The next generation of MASTER KEY™ diagrams is based upon musical shapes that are built with three notes. In musical terms, three note structures are referred to as triads. There are only four triads in all of diatonic music, and they have the respective names of major, minor, diminished, and augmented. These four, three-note shapes are represented in the MASTER KEY™ diagrams as different sized triangles, each built with various color coded intervals. As shown in FIG. 6, for example, the major triad 600 is built by stacking (in a clockwise direction) a major third 18, a minor third 16, and then a perfect fourth 20. This results in a triangle with three sides in the respective colors of green, yellow, and blue, following the assigned color for each interval in the triad. The diagrams for the remaining triads (minor, diminished, and augmented) follow a similar approach.

Figure 7:
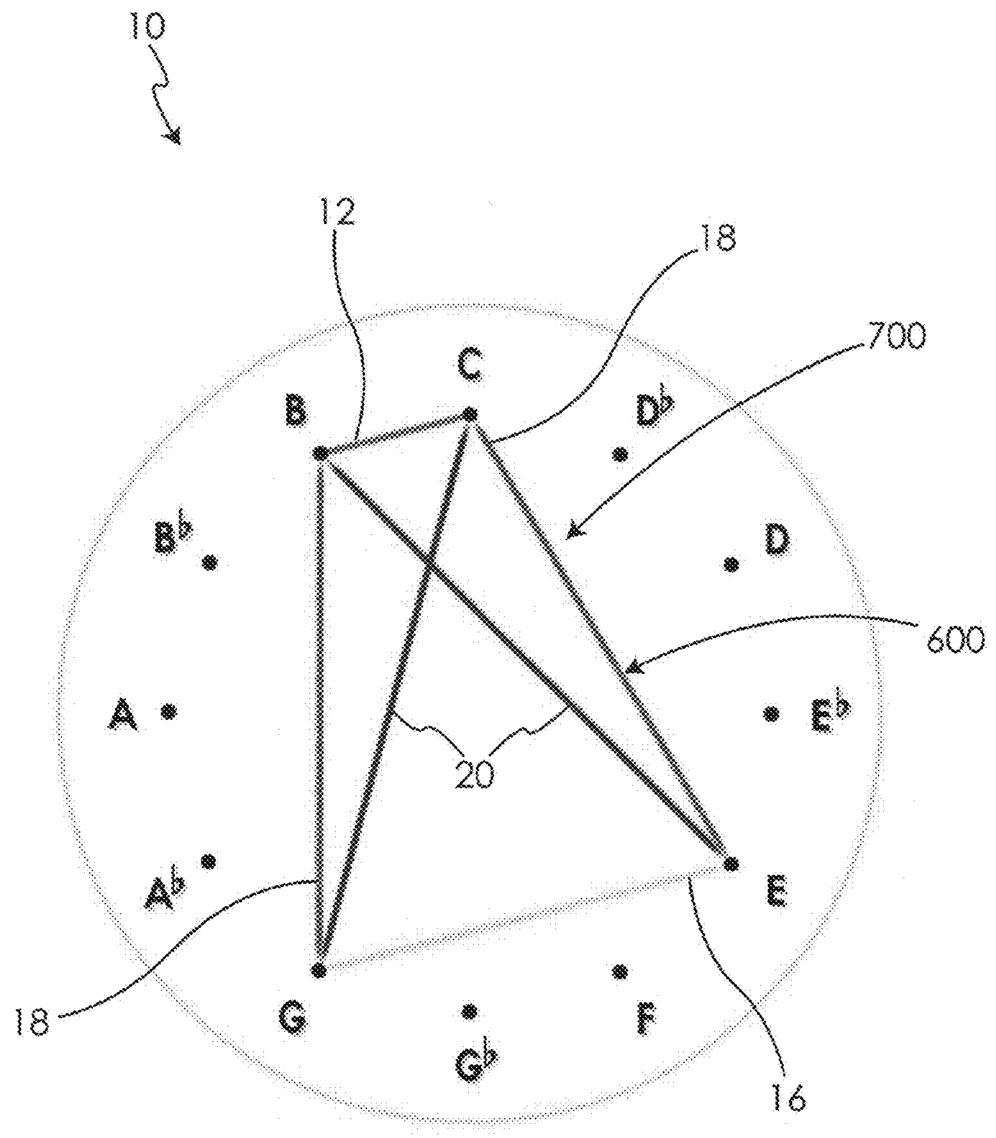
FIG. 7 is a diagram of a twelve-tone circle showing a major seventh chord.

The next group of MASTER KEY™ diagrams are developed from four notes at a time. Four note chords, in music, are referred to as seventh chords, and there are nine types of seventh chords. FIG. 7 shows the diagram of the first seventh chord, the major seventh chord 700, which is created by stacking the following intervals (as always, in a clockwise manner): a major third, a minor third 16, another major third 18, and a half step 12. The above description illustrates the outer shell of the major seventh chord 700 (a four-sided polyhedron); however, general observation will quickly reveal a new pair of 'internal' intervals, which haven't been seen in previous diagrams (in this instance, two perfect fourths 20). The eight remaining types of seventh chords can likewise be mapped on the MASTER KEY™ circle using this method.

Figure 8:
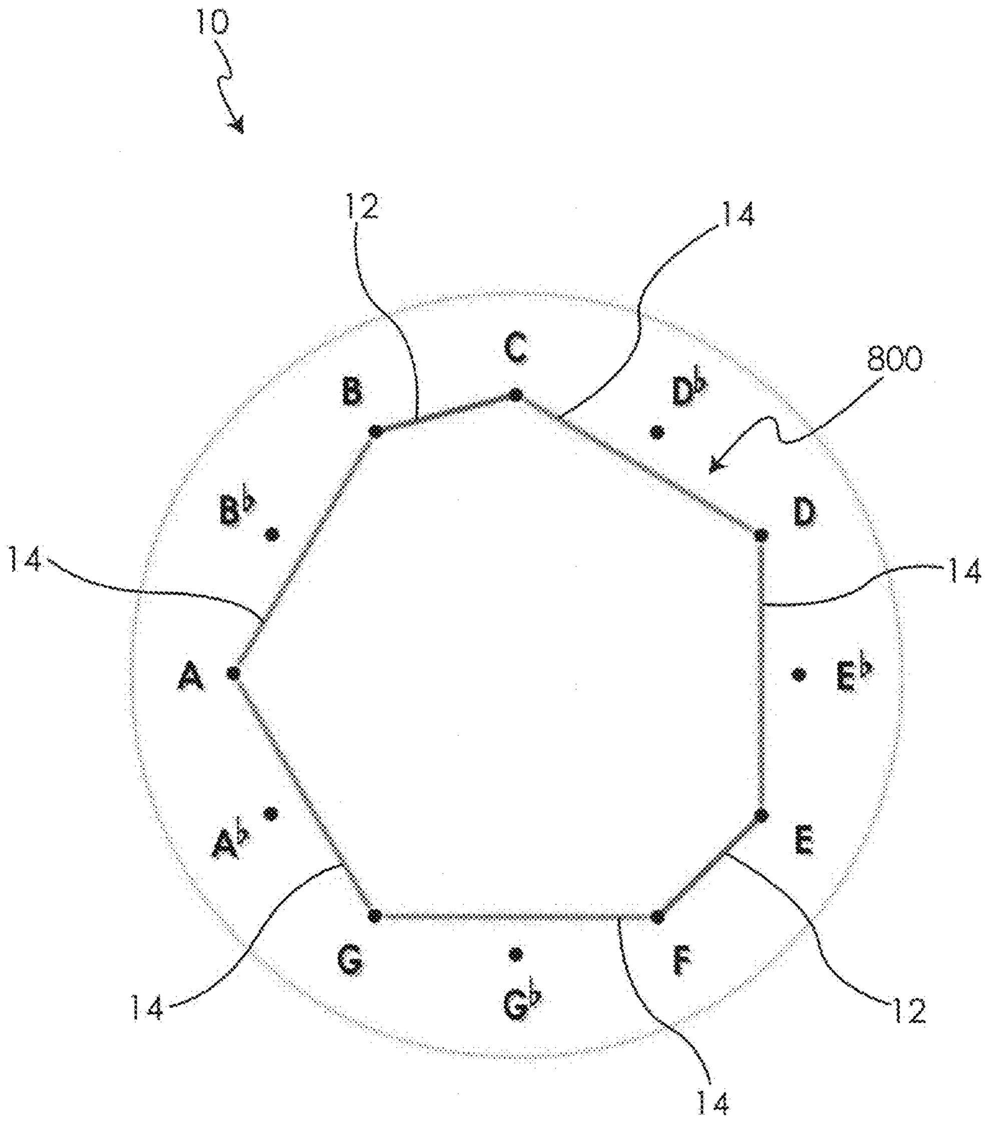
FIG. 8 is a diagram of a twelve-tone circle showing a major scale.

Every musical structure that has been presented thus far in the MASTER KEY™ system, aside from the six basic intervals, has come directly out of three main scales. Again, the three main scales are as follows: the Major Scale, the Harmonic-Minor Scale, and the Melodic-Minor Scale. The major scale is the most common of the three main scales and is heard virtually every time music is played or listened to in the western world. As shown in FIG. 8 and indicated generally at 800, the MASTER KEY™ diagram clearly shows the major scale's 800 makeup and its naturally lopsided nature. Starting at the top of the circle 10, one travels clockwise around the scale's outer shell. The following pattern of intervals is then encountered: whole step 14, whole step 14, half step 12, whole step 14, whole step 14, whole step 14, half step 12. The most important aspect of each scale diagram is, without a doubt, the diagram's outer 'shell.' Therefore, the various internal intervals in the scale's interior are not shown. Since we started at point 10.12, or C, the scale 800 is the C major scale. Other major scales may be created by starting at one of the other notes on the twelve-tone circle 10. This same method can be used to create diagrams for the harmonic minor and melodic minor scales as well.

Figure 9:
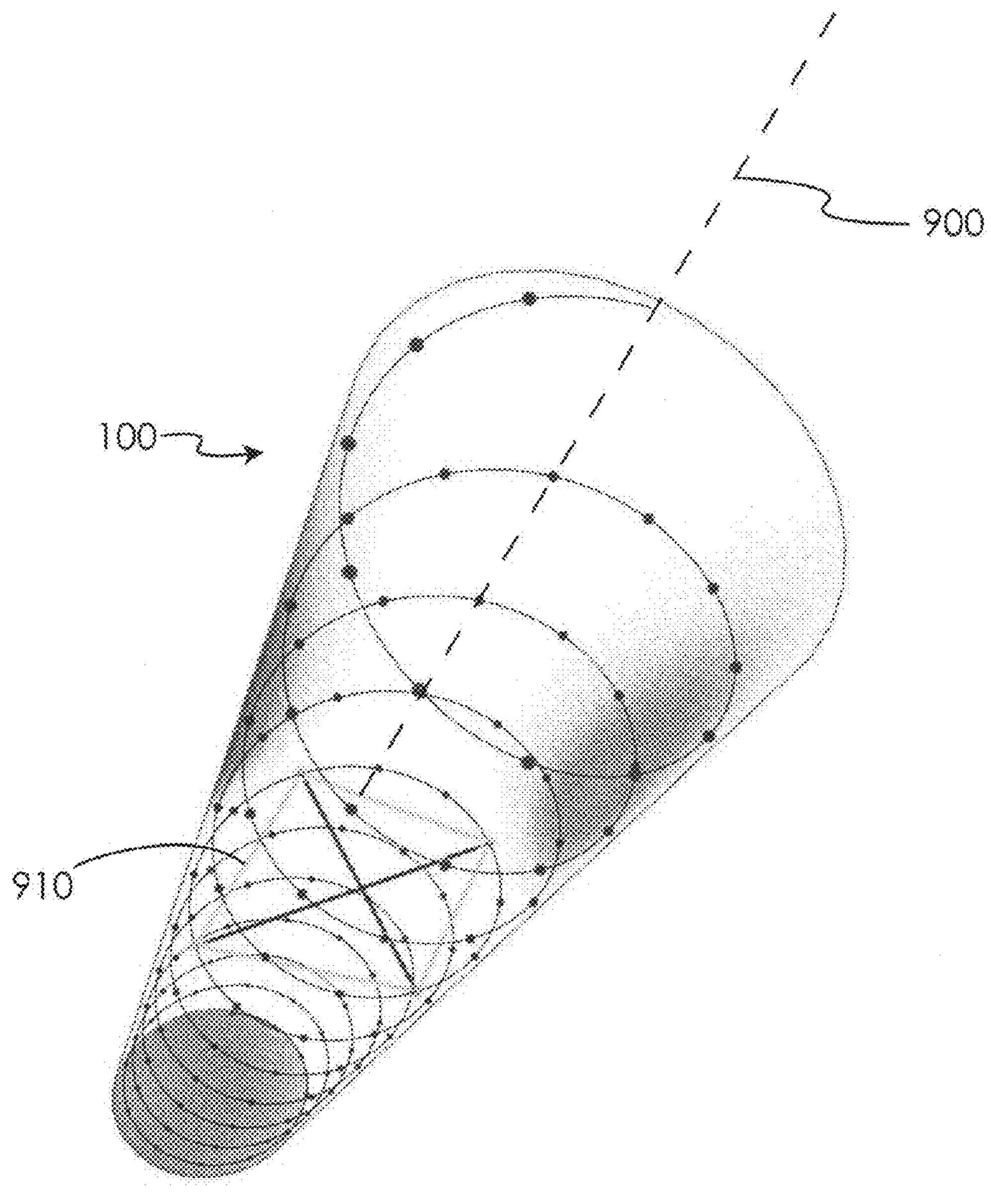
FIGS. 9-10 are diagrams of a helix showing a B diminished seventh chord.
Figure 10:
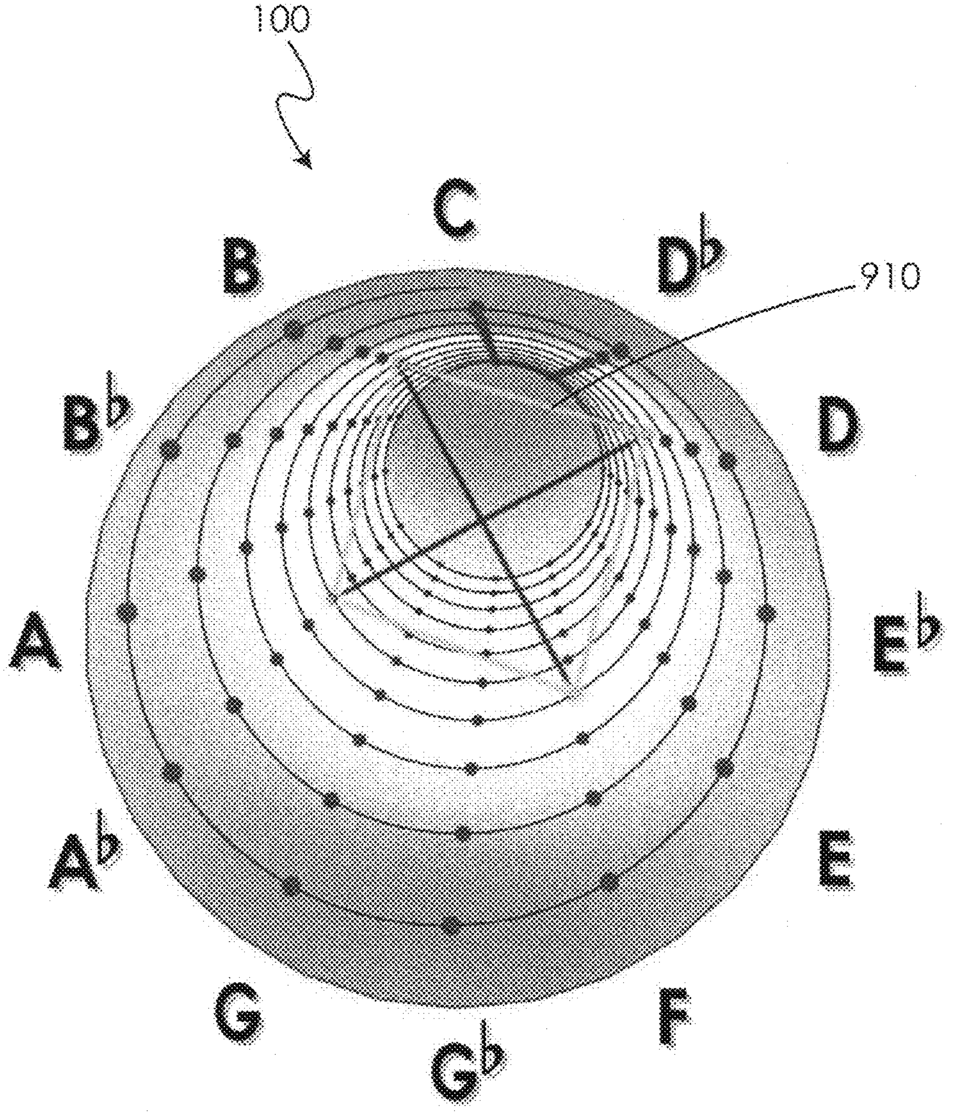

The previously described diagrams have been shown in two dimensions; however, music is not a circle as much as it is a helix. Every twelfth note (an octave) is one helix turn higher or lower than the preceding level. What this means is that music can be viewed not only as a circle but as something that will look very much like a DNA helix, specifically, a helix of approximately ten and one-half turns (i.e. octaves). There are only a small number of helix turns in the complete spectrum of audible sound; from the lowest auditory sound to the highest auditory sound. By using a helix instead of a circle, not only can the relative pitch difference between the notes be discerned, but the absolute pitch of the notes can be seen as well. For example, FIG. 9 shows a helix 100 about an axis 900 in a perspective view with a chord 910 (a fully diminished seventh chord in this case) placed within. In FIG. 10, the perspective has been changed to allow each octave point on consecutive turns of the helix to line up. This makes it possible to use a single set of labels around the helix. The user is then able to see that this is a B fully diminished seventh chord and discern which octave the chord resides in.

Figure 11:
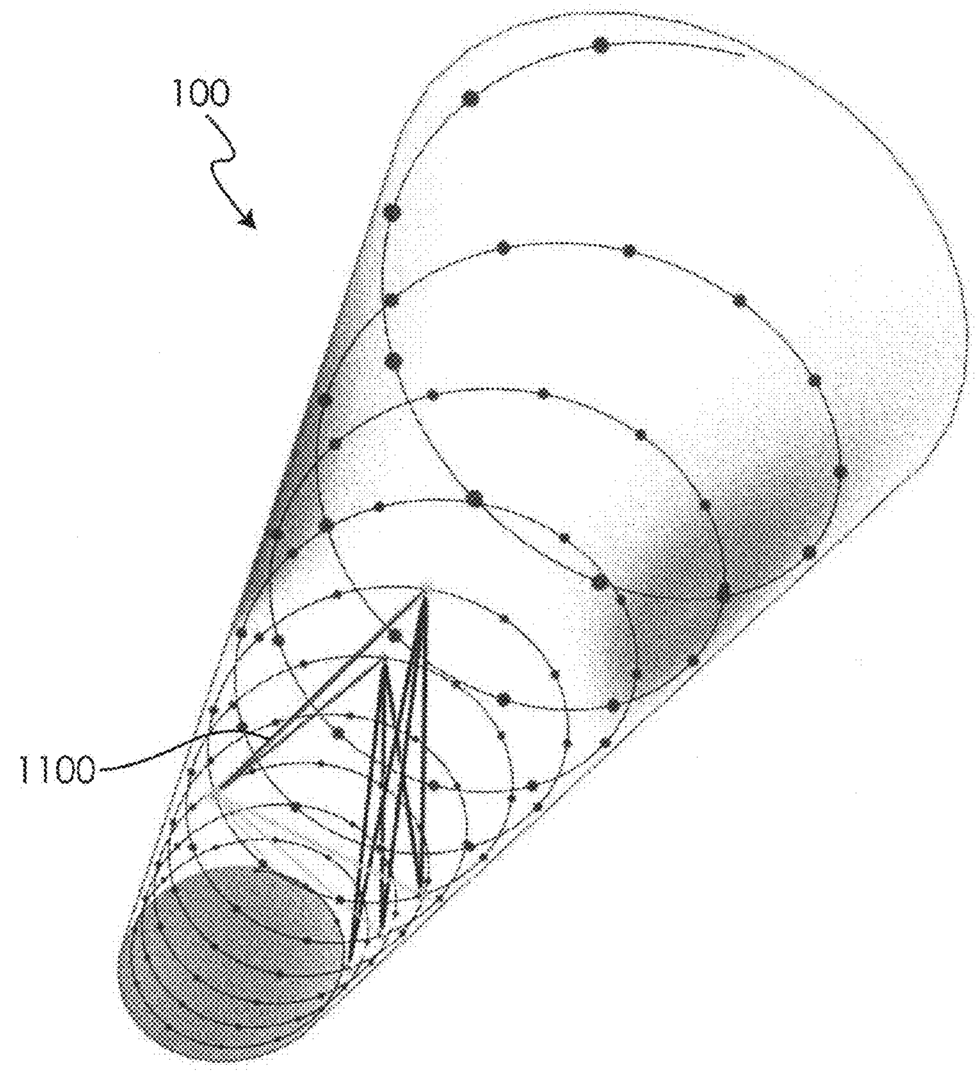
FIG. 11 is a diagram of a helix showing an F minor triad covering three octaves.

The use of the helix becomes even more powerful when a single chord is repeated over multiple octaves. For example, FIG. 11 shows how three F minor triad chords look when played together over three and one-half octaves. In two dimensions, the user will only see one triad, since all three of the triads perfectly overlap on the circle. In the three-dimensional helix, however, the extended scale is visible across all three octaves.

The above described MASTER KEY™ system provides a method for understanding the tonal information within musical compositions. Another method, however, is needed to deal with the rhythmic information, that is, the duration of each of the notes and relative time therebetween. Such rhythmic visualization methods are described in U.S. utility patent application Ser. No. 12/023,375 filed Jan. 31, 2008 entitled "Device and Method for Visualizing Musical Rhythmic Structures" which is also hereby incorporated by reference in its entirety.

In addition to being flawed in relation to tonal expression, traditional sheet music also has shortcomings with regards to rhythmic information. This becomes especially problematic for percussion instruments that, while tuned to a general frequency range, primarily contribute to the rhythmic structure of music. For example, traditional staff notation 1250, as shown in the upper portion of FIG. 12, uses notes 1254 of basically the same shape (an oval) for all of the drums in a modern drum kit and a single shape 1256 (an 'x' shape) for all of the cymbals. What is needed is a method that more intuitively conveys the character of individual rhythmic instruments and the underlying rhythmic structures present in a given composition.

Figure 12:
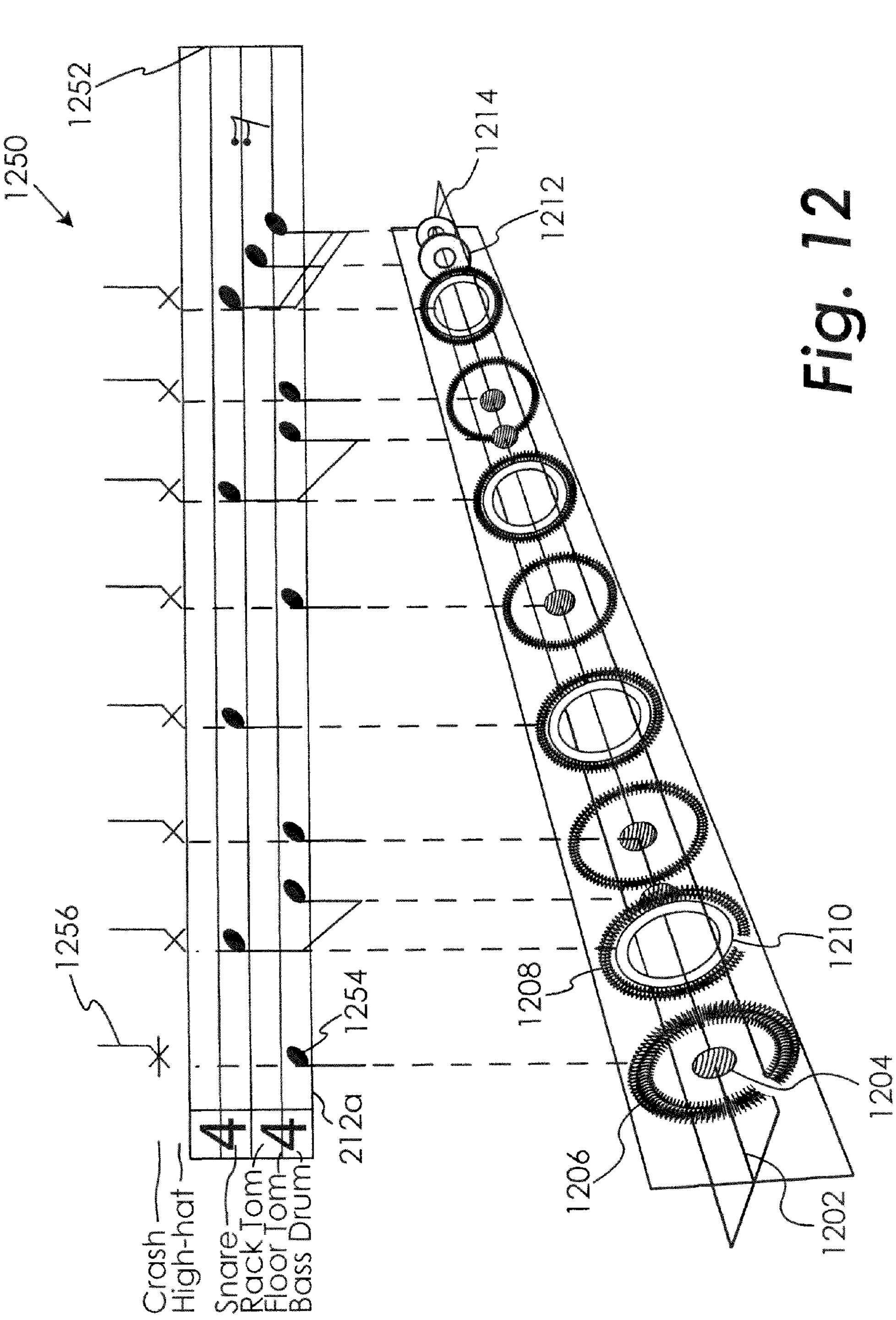
FIG. 12 is a perspective view of the visual representation of percussive music according to one embodiment shown with associated standard notation for the same percussive music.

The lower portion of FIG. 12 shows one embodiment of the disclosed method which utilizes spheroids 1204 and toroids 1206, 1208, 1210, 1212 and 1214 of various shapes and sizes in three dimensions placed along a time line 1202 to represent the various rhythmic components of a particular musical composition. The lowest frequencies or lowest instrument in the composition (i.e. the bass drum) will appear as spheroids 1204. As the rhythmical frequencies get higher in range, toroids 1206, 1208, 1210, 1212 and 1214 of various sizes are used to represent the sounded instrument. While the diameter and thicknesses of these spheroids and toroids may be adjustable components that are customizable by the user, the focus will primarily be on making the visualization as "crisply" precise as possible. In general, therefore, as the relative frequency of the sounded instrument increases, the maximum diameter of the spheroid or toroid used to depict the sounding of the instrument also increases. For example, the bass drum is represented by a small spheroid 1204, the floor tom by toroid 1212, the rack tom by toroid 1214, the snare by toroid 1210, the high-hat cymbal by toroid 1208, and the crash cymbal by toroid 1206. Those skilled in the art will recognize that other geometric shapes may be utilized to represent the sounds of the instruments within the scope of the disclosure.

Figure 13:
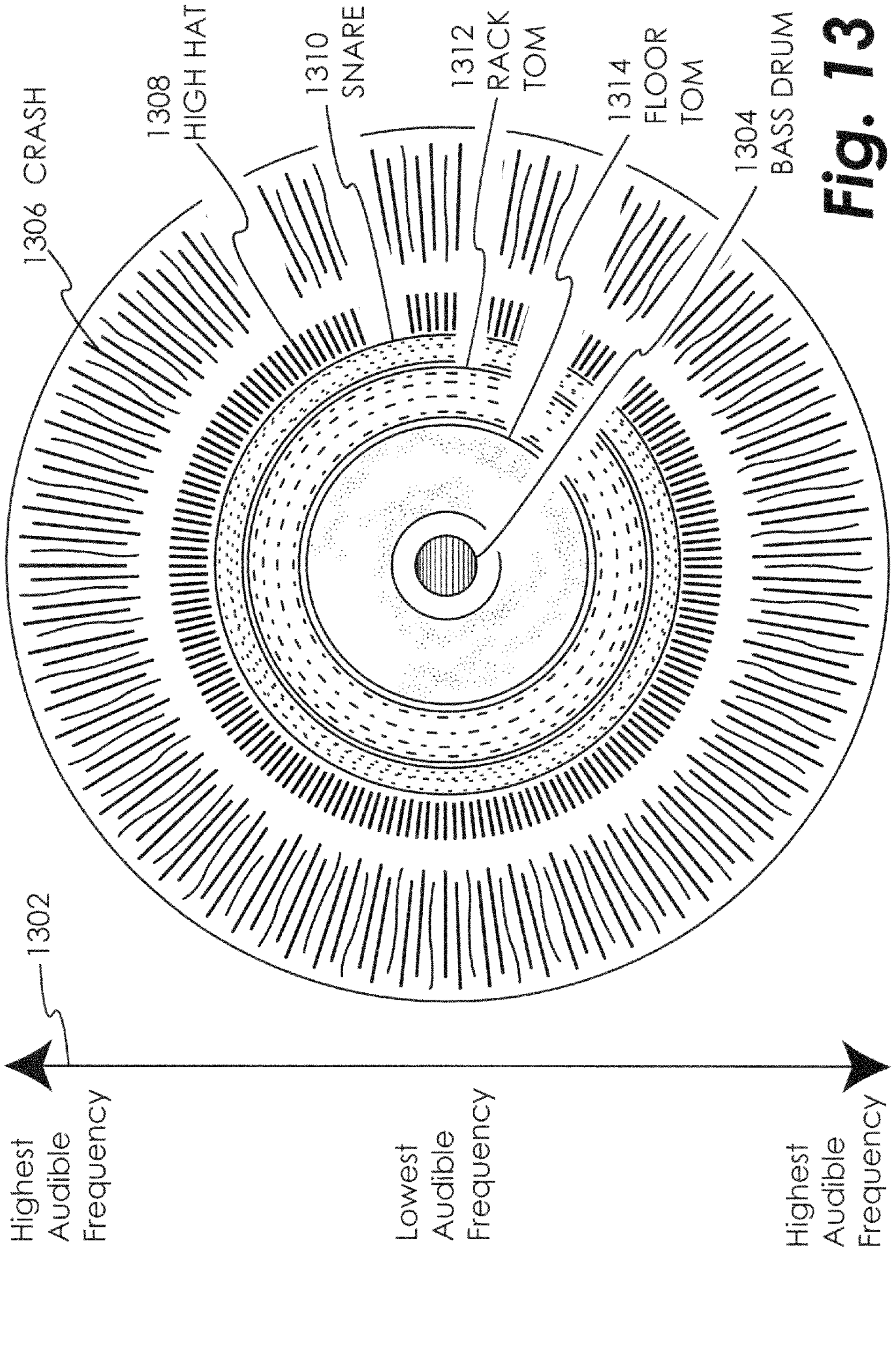
FIG. 13 is a two dimensional view looking along the time line of a visual representation of percussive music at an instant when six percussive instruments are being simultaneously sounded.

FIG. 13 shows another embodiment which utilizes a two-dimensional view looking into the time line 1202. In this embodiment, the spheroids 1204 and toroids 1206, 1208, 1210 and 1212 from FIG. 12 correspond to circles 1304 and rings 1306, 1308, 1310 and 1312, respectively. The lowest frequencies (i.e. the bass drum) will appear as a solid circle 1304 in a hard copy embodiment. Again, as the relative frequency of the sounded instrument increases, the maximum diameter of the circle or ring used to depict the sounding of the instrument also increases, as shown by the scale 1302.

Because cymbals have a higher auditory frequency than drums, cymbal toroids have a resultantly larger diameter than any of the drums. Furthermore, the amorphous sound of a cymbal will, as opposed to the crisp sound of a snare, be visualized as a ring of varying thickness, much like the rings of a planet or a moon. The "splash" of the cymbal can then be animated as a shimmering effect within this toroid. In one embodiment, the shimmering effect can be achieved by randomly varying the thickness of the toroid at different points over the circumference of the toroid during the time period in which the cymbal is being sounded as shown by toroid 1204 and ring 1306 in FIGS. 12 and 13, respectively. It shall be understood by those with skill in the art that other forms of image manipulation may be used to achieve this shimmer effect.

Figure 14:
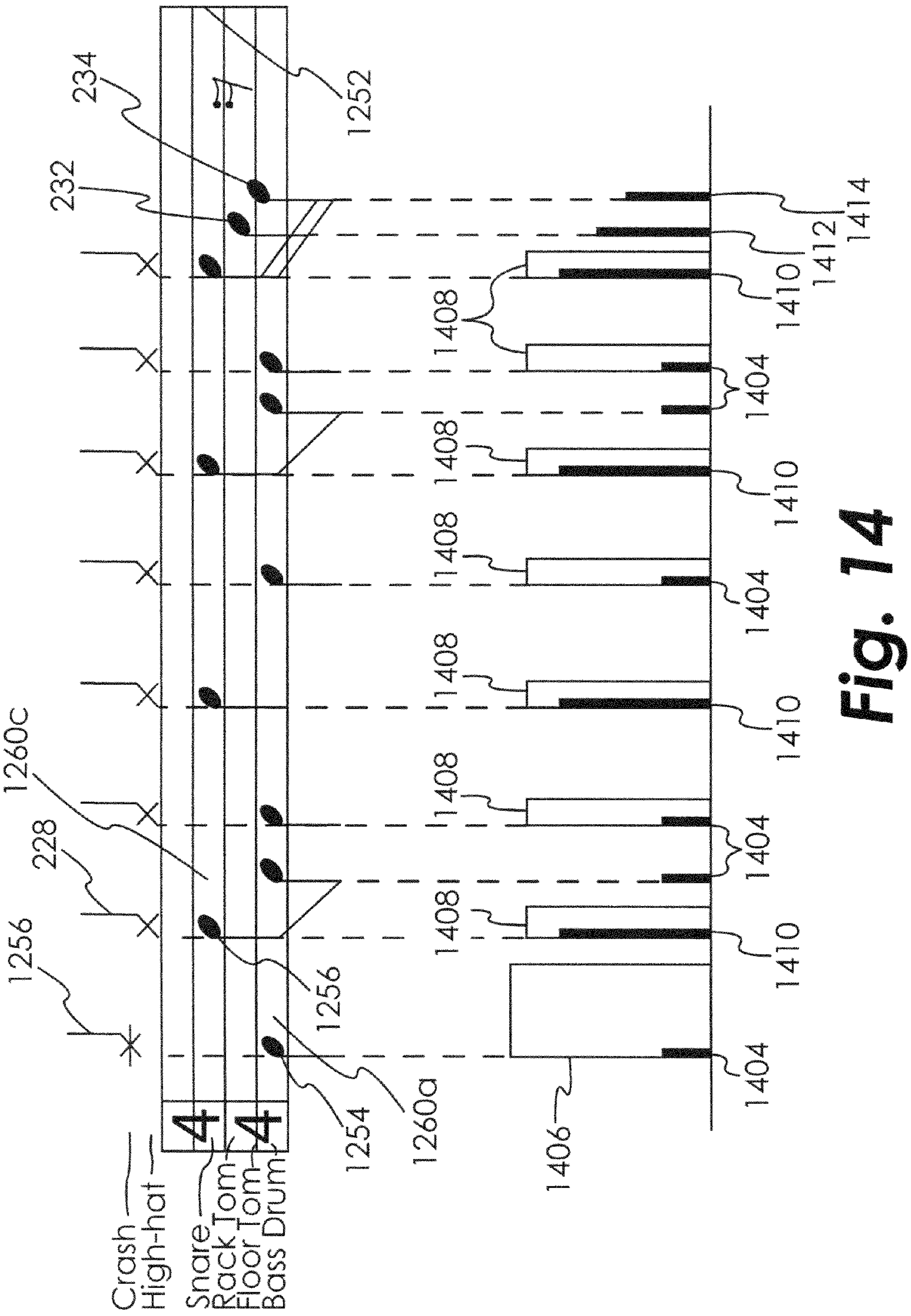
FIG. 14 is a two dimensional view looking perpendicular to the time line of the visual representation of percussive music according to the disclosure associated with standard notation for the same percussive music of FIG. 12.

FIG. 14 shows another embodiment which utilizes a two dimensional view taken perpendicular to the time line 1202.

In this view, the previously seen circles, spheroids, rings or toroids turn into bars of various height and thickness. Spheroids 1204 and toroids 1206, 1208, 1210, 1212 and 1214 from FIG. 12 correspond to bars 1404, 1406, 1408, 1410, 1412, and 1414 in FIG. 14. For each instrument, its corresponding bar has a height that relates to the particular space or line in, above, or below the staff on which the musical notation for that instrument is transcribed in standard notation. Additionally, the thickness of the bar for each instrument corresponds with the duration or decay time of the sound played by that instrument. For example, bar 1406 is much wider than bar 1404, demonstrating the difference in duration when a bass drum and a crash cymbal are struck. To enhance the visual effect when multiple instruments are played simultaneously, certain bars may be filled in with color or left open.

The spatial layout of the two dimensional side view shown in FIG. 14 also corresponds to the time at which the instrument is sounded, similar to the manner in which music is displayed in standard notation (to some degree). Thus, the visual representation of rhythm generated by the disclosed system and method can be easily converted to sheet music in standard notation by substituting the various bars (and spaces therebetween) into their corresponding representations in standard notation. For example, bar 1404 (representing the bass drum) will be converted to a note 1254 in the lowest space 1260*a* of staff 1252. Likewise, bar 1410 (representing the snare drum) will be converted to a note 1256 in the second highest space 1260*c* of staff 1252.

The 3-D visualization of this Rhythmical Component as shown, for example, in FIG. 12, results in imagery that appears much like a 'wormhole' or tube. For each composition of music, a finite length tube is created by the system which represents all of the rhythmic structures and relationships within the composition. This finite tube may be displayed to the user in its entirety, much like traditional sheet music. For longer compositions, the tube may be presented to the user in sections to accommodate different size video display screens. To enhance the user's understanding of the particular piece of music, the 3-D 'wormhole' image may incorporate real time animation, creating the visual effect of the user traveling through the tube. In one embodiment, the rhythmic structures appear at the point "nearest" to the user as they occur in real time, and travel towards the "farthest" end of the tube, giving the effect of the user traveling backwards through the tube.

The two-dimensional view of FIG. 13 can also be modified to incorporate a perspective of the user looking straight "into" the three-dimensional tube or tunnel, with the graphical objects made to appear "right in front of" the user and then move away and into the tube, eventually shrinking into a distant center perspective point. It shall be understood that animation settings for any of the views in FIGS. 12-14 can be modified by the user in various embodiments, such as reversing the animation direction or the duration of decay for objects which appear and the fade into the background. This method of rhythm visualization may also incorporate the use of color to distinguish the different rhythmic structures within a composition of music, much like the MASTER KEY™ diagrams use color to distinguish between tonal intervals. For example, each instance of the bass drum being sounded can be represented by a sphere of a given color to help the user visually distinguish it when displayed among shapes representing other instruments.

In other embodiments, each spheroid (whether it appears as such or as a circle or line) and each toroid (whether it appears as such or as a ring, line or bar) representing a beat when displayed on the graphical user interface will have an associated small "flag" or access control button. By mouse-clicking on one of these access controls, or by click-dragging a group of controls, a user will be able to highlight and access a chosen beat or series of beats. With a similar attachment to the Master Key™ music visualization software (available from Musical DNA LLC, Indianapolis, Ind.), it will become very easy for a user to link chosen notes and musical chords with certain beats and create entire musical compositions without the need to write music using standard notation. This will allow access to advanced forms of musical composition and musical interaction for musical amateurs around the world.

The present disclosure utilizes the previously described visualization methods as a basis for an audio mixing and editing system. The easily visualized tonal and rhythmic shapes provide a much more intuitive graphical format for use in interpreting the audio characteristics of a recorded track or combination of tracks. Using these visualizations, an engineer can improve the quality and efficiency of the mixes or edits required for a sound recording project.

Figure 15:
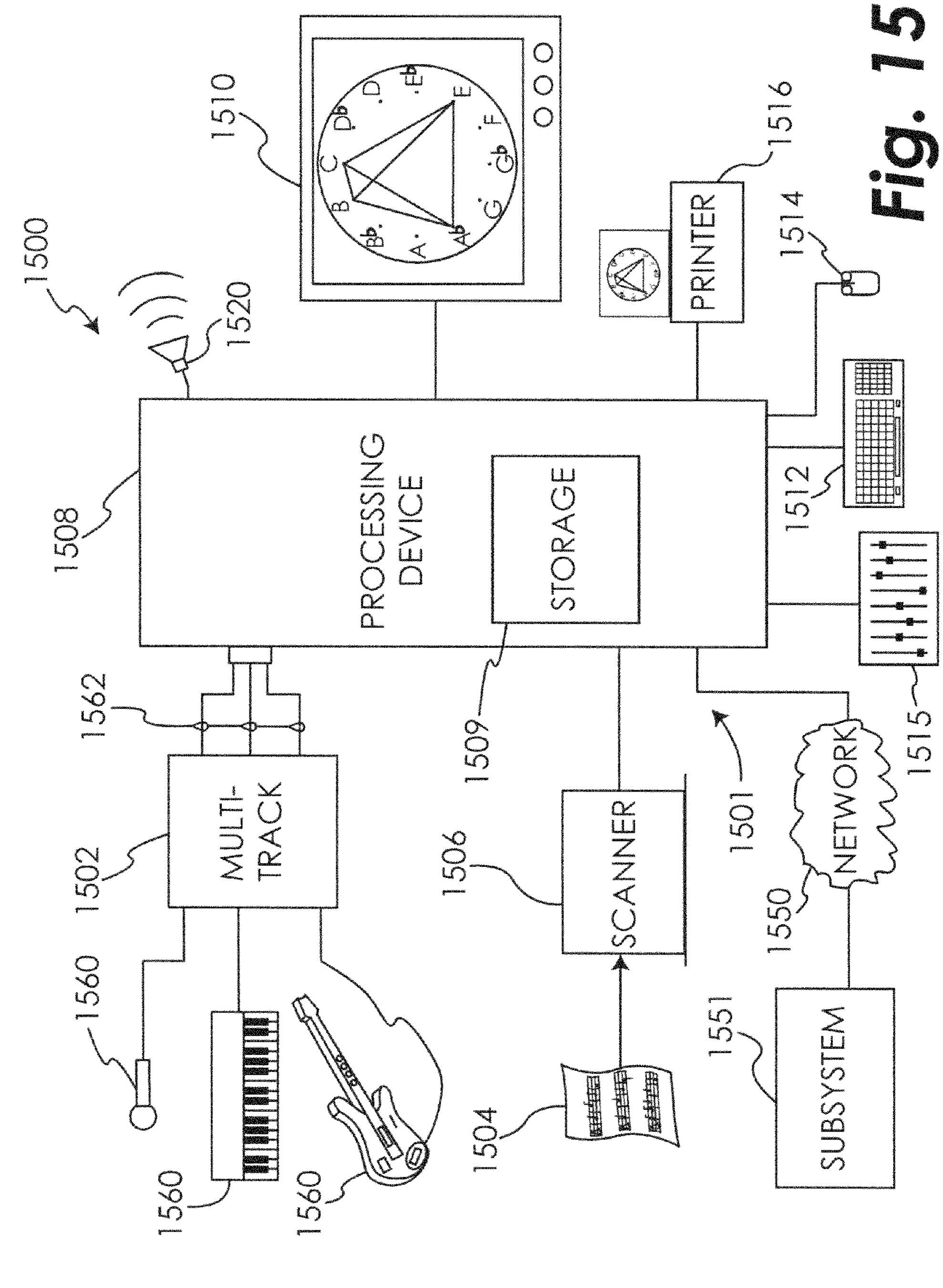
FIG. 15 is a schematic block diagram showing an audio mixing and editing system according to one embodiment.

FIG. 15, shows, in schematic form, one embodiment of an audio editing and mixing system 1500 according to the present disclosure. It is understood that one or more of the functions described herein may be implemented as either hardware or software, and the manner in which any feature or function is described does not limit such implementation only to the manner or particular embodiment described. The system 1500 may include a first subsystem 1501 including a recorder 1502, a processing device 1508, a data storage device 1509, a display 1510, user input devices such as keyboard 1512, mouse 1514, and mixing controller 1515, a printer device 1516 and one or more speakers 1520. These devices are coupled to allow the input of recorded audio tracks into the processing device 1508 so that the audio information can be produced by speaker 1520 and visual representations of the signals can be displayed, printed, or manipulated by users. Although the system 1500 is described as including a recorder 1502, it is understood that system 1500 may be configured to operate with an external or existing recorder from which the processing device receives the signals and generates corresponding visualizations. Scanning device 1506 is also optionally included to provide an alternate source of input by scanning written sheet music 1504 to be converted into audio signals by processing unit 1508.

Recorder 1502 may comprise a multi-track analog audio tape or digital audio recorder which receives one or more individual audio signals from audio sources 1560. Audio sources 1560 may include microphones, traditional analog or digital musical instruments, digital music players, such as MP3 devices, preamplifiers, analog to digital converters, submixing units, or other audio sources commonly used in a recording studio. In addition, the functionality of multi-track recorder 1502 may be incorporated into the processing device 1508, with the individual track signals being routed directly from audio sources 1560 to the processing device 1508.

The processing device 1508 may be implemented on a personal computer, a workstation computer, a laptop computer, a palmtop computer, a wireless terminal having computing capabilities (such as a cell phone having a Windows CE or Palm operating system), an embedded processor system, or the like. It will be apparent to those of ordinary skill in the art that other computer system architectures may also be employed.

In general, such a processing device 1508, when implemented using a computer, comprises a bus for communicating information, a processor coupled with the bus for processing information, a main memory coupled to the bus for storing information and instructions for the processor, a read-only memory coupled to the bus for storing static information and instructions for the processor. The display 1510 is coupled to the bus for displaying information for a computer user and the user input devices 1512, 1514, and 1515 are coupled to the bus for communicating information and command selections to the processor. A mass storage interface for communicating with data storage device 1509 containing digital information may also be included in processing device 1508 as well as a network interface for communicating with a network.

The processor may be any of a wide variety of general purpose processors or microprocessors such as the PENTIUM microprocessor manufactured by Intel Corporation, a POWER PC manufactured by IBM Corporation, a SPARC processor manufactured by Sun Corporation, or the like. It will be apparent to those of ordinary skill in the art, however, that other varieties of processors may also be used in a particular computer system. Display 1510 may be a liquid crystal device (LCD), a light emitting diode device (LED), a cathode ray tube (CRT), a plasma monitor, a holographic display, or other suitable display device. The mass storage interface may allow the processor access to the digital information in the data storage devices via the bus. The mass storage interface may be a universal serial bus (USB) interface, an integrated drive electronics (IDE) interface, a serial advanced technology attachment (SATA) interface or the like, coupled to the bus for transferring information and instructions. The data storage device 1509 may be a conventional hard disk drive, a floppy disk drive, a flash device (such as a jump drive or SD card), an optical drive such as a compact disc (CD) drive, digital versatile disc (DVD) drive, HD DVD drive, BLUE-RAY DVD drive, or another magnetic, solid state, or optical data storage device, along with the associated medium (a floppy disk, a CD-ROM, a DVD, etc.)

In general, the processor retrieves processing instructions and data from the data storage device 1509 using the mass storage interface and downloads this information into random access memory for execution. The processor then executes an instruction stream from random access memory or read-only memory. Command selections and information that is input at user input devices 1512, 1514, and 1515 are used to direct the flow of instructions executed by the processor. The results of this processing execution are then displayed on display device 1510.

The processing device 1508 is configured to generate an output for viewing on the display 1510. Preferably, the video output to display 1510 is also a graphical user interface, allowing the user to interact with the displayed information.

The system 1500 may optionally include one or more remote subsystems 1551 for communicating with processing device 1508 via a network 1550, such as a LAN, WAN or the internet. Remote subsystem 1550 may be configured to act as a web server, a client or both and will preferably be browser enabled. Thus with system 1500, remote recording, mixing, and editing of audio material is possible.

In operation, multi-track recorder 1502 provides the processing device 1508 with one or more tracks 1562 of recorded audio data. Tracks 1562 may be created during a live recording session, or they may have been recorded previously. One or more tracks 1562 may be provided to processing device 1508 from recording sessions that occurred at different locations or at different times. Remote subsystem 1551 can be utilized to provide additional audio track material to processing device 1508 over network 1550. It shall be understood that different forms of audio connections may be used to transmit the individual track signals to processing device 1508. For example, individual wired analog connections can be utilized for each track, or the signals can be digitized and transmitted over a single cable using a multiplexing or digitally encoded protocol with decoding and separation being done by the processing device 1508.

Tracks 1562 are applied to the processor 1508, which creates tonal and rhythm visualization components for each of the tracks 1562. In one embodiment, the processing device 1508 can implements software operating as a series of band pass filters to separate the signals into different frequency components. In another embodiment, the processing device 1508 can implement software operating as an audio signal or note extractor. The frequency content is then mapped to certain colors within a tonal circle or helix and displayed to the user. Various audio frequency extraction methods are described in U.S. patent application Ser. No. 61/025,374 filed Feb. 1, 2008 entitled "Apparatus and Method for Visualization of Music Using Note Extraction" which is hereby incorporated by reference in its entirety.

By viewing the track visualization components via display device 1510, for example, individually and in combination with other tracks, adjustment (i.e., editing and mixing) of the audio response characteristics, e.g., bass, treble, volume, pan, sibilance, cowbell as only a few non-limiting examples, can be much more easily made than merely by listening. This adjustment may be made using mixing controller 1515, mouse 1514, or keyboard 1512. In one embodiment, mixing controller 1515 comprises a plurality of electro-mechanical sliders, with each slider assigned to a single track or group of tracks. In other embodiments, mouse 1514 is used to adjust "virtual" sliders displayed on display 1510 using the "click and drag" method.

Figure 16:
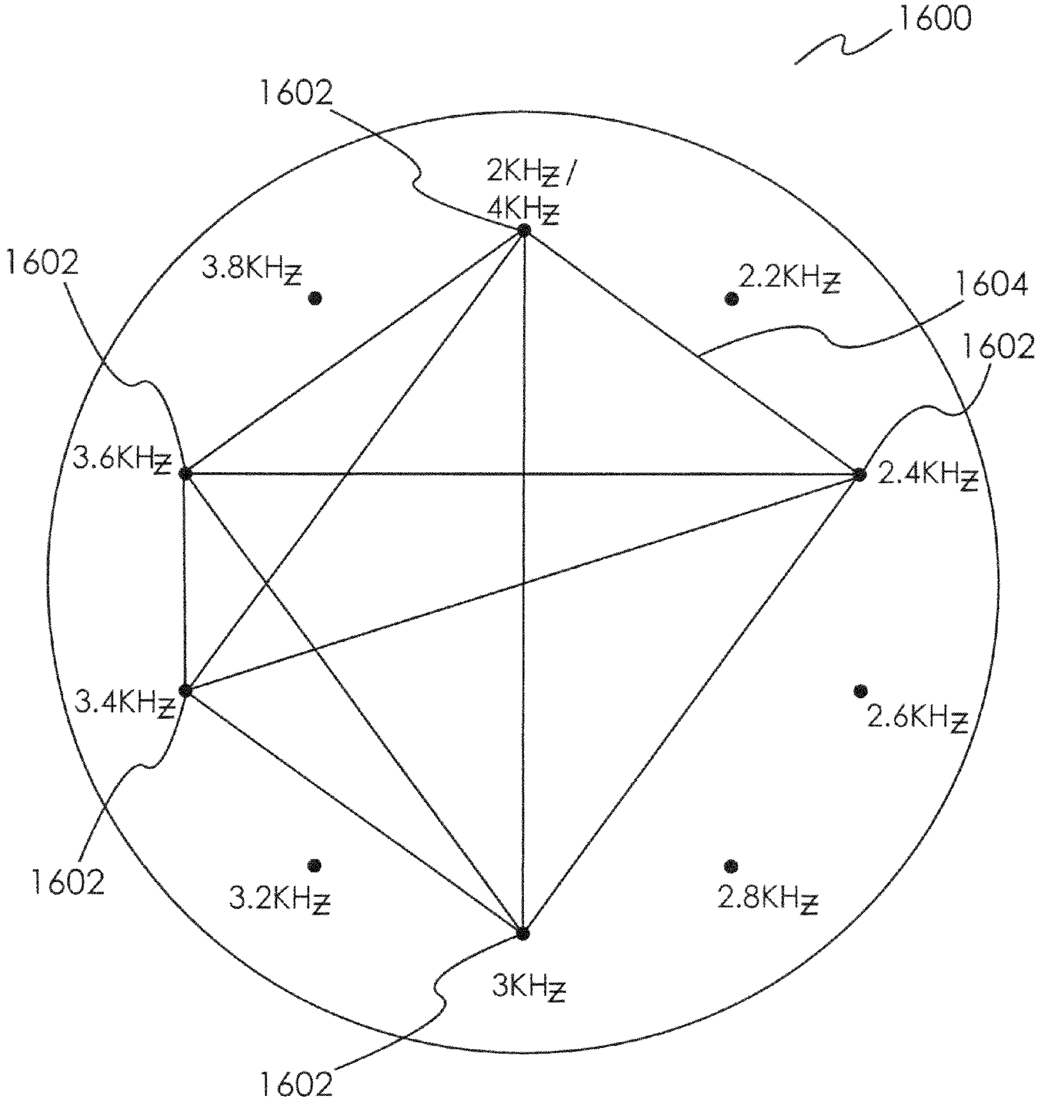
FIG. 16 is a visualization of the frequency components contained within an input audio signal according to one embodiment.

FIG. 16 shows a visualization 1600 of a range of frequencies contained within a single recorded track. The points 1602 represent the individual tonal components of the sensed sound, with lines 1604 connecting therebetween. Although FIG. 16 depicts a sound that has occurred within the octave range between 2 KHz and 4 KHz, it will be understood that any range or number of tonal subdivisions may be used depending on the level of detail or tonal range required. The color of lines 1604 can be assigned according to a predefined scheme to indicate the relative relationships of the various tonal elements.

Figure 17:
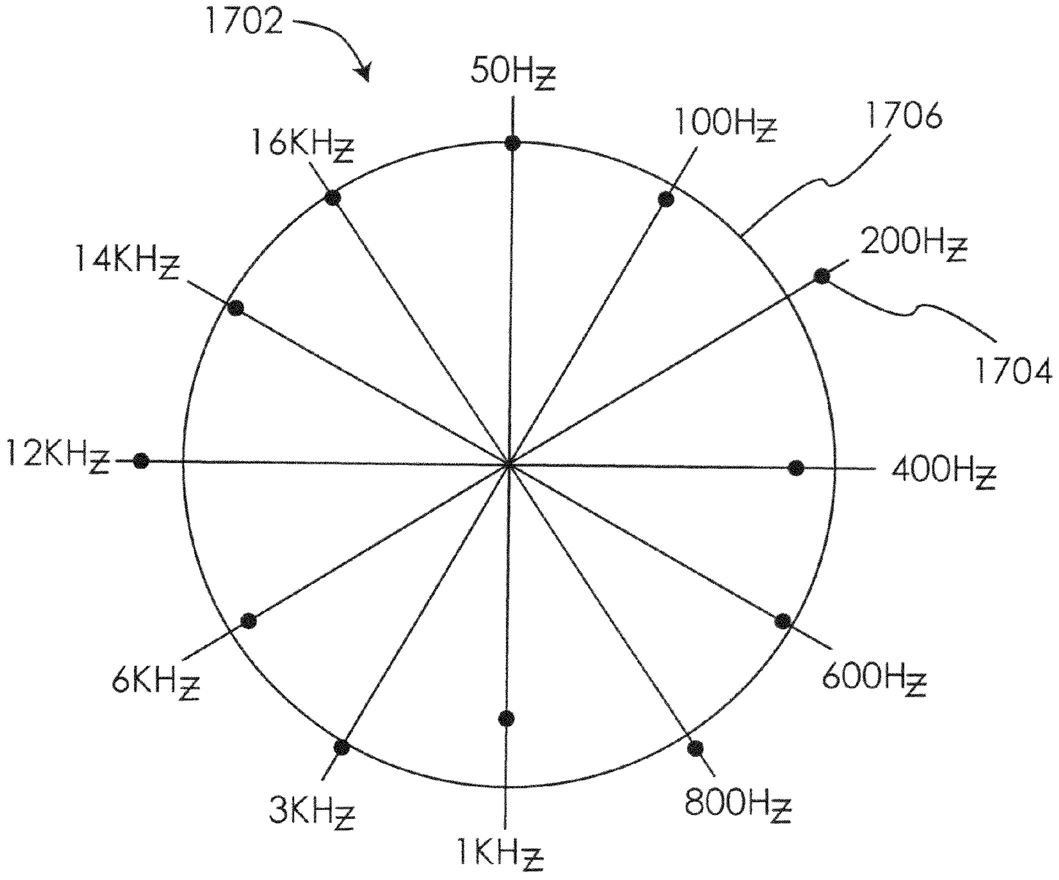
FIG. 17 is a visualization of the frequency and amplitude characteristics of an input audio signal according to one embodiment.

FIG. 17 illustrates a visualization created by processing device 1508 according to another embodiment. A tonal circle 1702 is subdivided into a number of frequency intervals determined by the desired accuracy. At each interval, an indicator 1704 is displayed which represents a given frequency. The amplitude of the signal at the given frequency corresponds to the radial distance of the indicator from a reference perimeter 1706. As the amplitude increases or decreases, the indicator will move radially outward or inward respectively. For example, as shown in FIG. 17, there is a higher amplitude at the 200 Hz frequency and a lower amplitude at the 1 KHz frequency. In addition to viewing a single visualization 1702 for a single track, multiple visualizations 1702 can be displayed simultaneously, one for each track in a multi-track recording, so the user can make comparisons and adjust the volume or other properties of the tracks accordingly. This visualization can be further extended by displaying the circle as a continuous helix upon which the various amplitude indicators are displayed.

Figure 18:
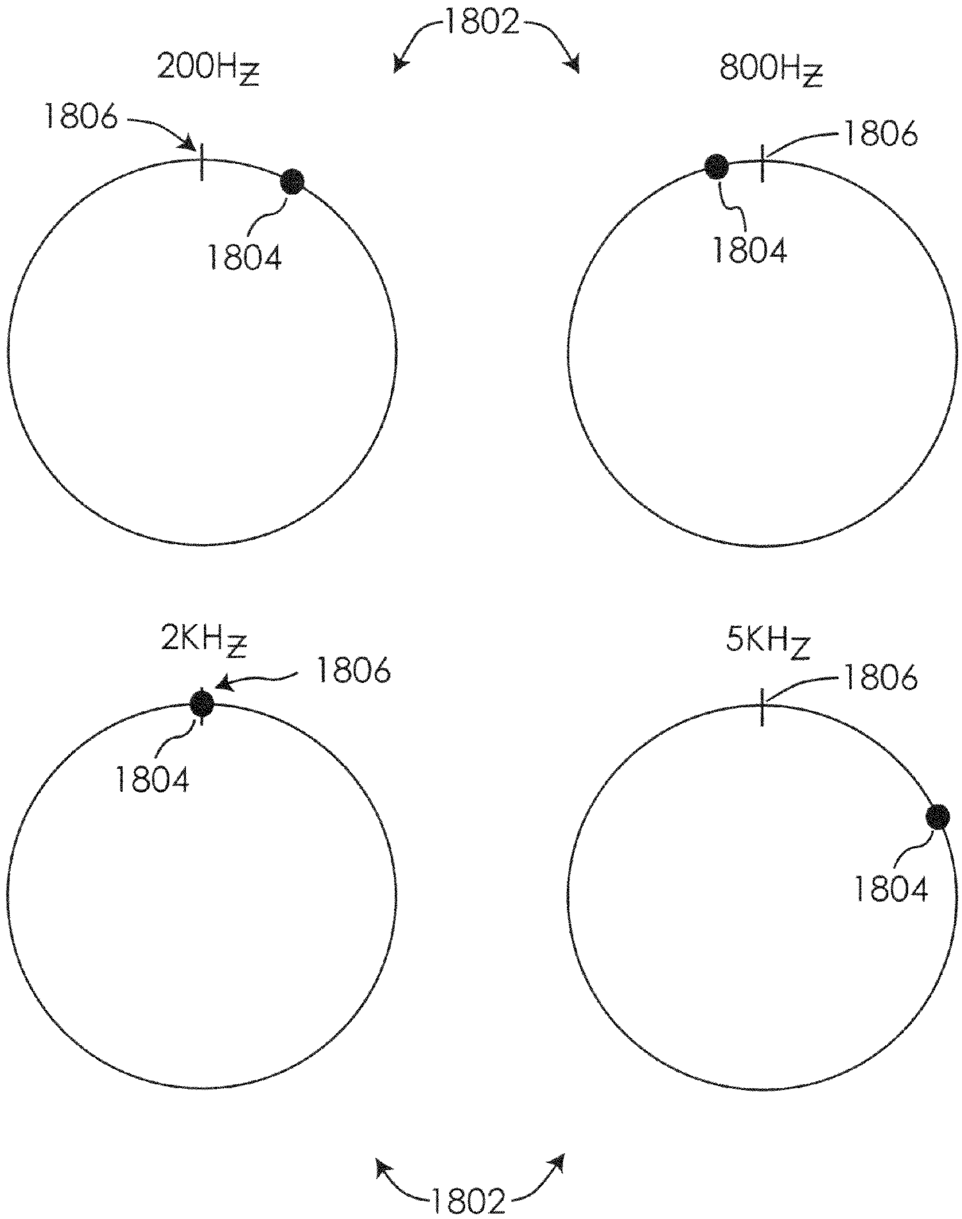
FIG. 18 is a set of multiple visualizations displayed simultaneously conveying the frequency and amplitude characteristics of an input audio signal according to one embodiment.

FIG. 18 shows another embodiment of the present disclosure in which separate tonal circle visualizations 1802 are shown for each frequency to be measured (200 Hz, 800 Hz, 2 KHz, and 5 KHz in this example). In this embodiment, the amplitude of the input signal at a given frequency point corresponds to the distance of the indicators 1804 from a perimeter reference point 1806. As shown in FIG. 18, the signal amplitude is higher than the reference point 1806 for the 200 Hz and 5 KHz frequency bands. As the user lowers the amplitude of the original signal via user input device 1512, 1514, or 1515, the indicator 1804 will move closer to the reference point 1806. In other embodiments, the amplitude of the signal can be made to correspond to the diameter or color intensity of the indicator 1806, providing the user with additional visual indicators to ease the mixing and editing process.

In addition to amplitude, other signal characteristics can be displayed using the method of the present disclosure. For example, the signal phase in relation to an established time reference can be displayed using the circular representations discussed above. Information concerning the amount of compression or limiting can also be displayed, along with data representing thresholds, rates, attacks, and release.

While the disclosure has been illustrated and described in detail in the drawings and foregoing description, the same is to be considered as illustrative and not restrictive in character, it being understood that only the preferred embodiments have been shown and described and that all-changes, modifications and equivalents that come within the spirit of the disclosure provided herein are desired to be protected. The articles "a," "an," "said," and "the" are not limited to a singular element, and may include one or more such elements.

What is claimed:

1. An audio mixing and editing system, comprising:

(1) a processing device;

(2) a user control device operatively connected to said processing device; and (3) a display operatively connected to said processing device;

wherein:

said processing device executes computer readable code to create a visual representation of a first measured amplitude of a first audio track in a multi-track input for output on said display as visual feedback to a user performing audio mixing and editing functions related to the multi-track input;

wherein:

said visual representation is generated according to a method comprising the steps of:

(a) providing a first plurality of labels in a pattern of a circular arc, wherein:

(1) the first plurality of labels corresponds to a first plurality of respective amplitudes;

(2) moving clockwise or counter-clockwise on the arc between any one of said labels represents a first amplitude increment;

(b) identifying a reference amplitude for the first audio track;

(c) receiving the first measured amplitude of the first audio track;

(d) identifying a first one of said first plurality of labels corresponding to the reference amplitude;

(e) identifying a second one of said first plurality of said labels corresponding to the first measured amplitude; and (f) creating a first line connecting the first one of said first plurality of said labels and the second one of said first plurality of said labels, wherein:

(1) the first line is a first color if the reference amplitude and the first measured amplitude are separated by the first amplitude increment;

(2) the first line is a second color if the reference amplitude and the first measured amplitude are separated by a first multiple of the first amplitude increment;

(3) the first line is a third color if the reference amplitude and the first measured amplitude are separated by a second multiple of the first amplitude increment;

(4) the first line is a fourth color if the reference amplitude and the first measured amplitude are separated by a third multiple of the first amplitude increment;

(5) the first line is a fifth color if the reference amplitude and the first measured amplitude are separated by a fourth multiple of the first amplitude increment; and (6) the first line is a sixth color if the reference amplitude and the first measured amplitude are separated by a fifth multiple of the first amplitude increment.

2. The system of claim 1, wherein step (a) of said method further comprises arranging each of the labels to be substantially evenly spaced from each adjacent label.

3. The system of claim 1, wherein said circular arc comprises a circle.

4. The system of claim 3, wherein moving clockwise up to 180 degrees from said reference amplitude on said circle represents an increase in amplitude and moving counter-clockwise up to 180 degrees from said reference amplitude on said circle represents a decrease in amplitude.

5. The system of claim 1, wherein the first color is red, the second color is orange, the third color is yellow, the fourth color is green, the fifth color is blue and the sixth color is purple.

6. The system of claim 1, wherein:

the first color has a first wavelength that is larger than a second wavelength of the second color;

the second wavelength is larger than a third wavelength of the third color;

the third wavelength is larger than a fourth wavelength of the fourth color;

the fourth wavelength is larger than a fifth wavelength of the fifth color; and the fifth wavelength is larger than an sixth wavelength of the sixth color.

7. The system of claim 1, wherein a plurality of said visual representations are generated on the display using said method, each one of said visual representations corresponding to a different one of said audio tracks in said multi-track input, each one of said visual representations being displayed as a plurality of labels in the pattern of a separate circular arc.

8. The system of claim 1, wherein said method further comprises the steps of:

(g) receiving a second measured amplitude for a second audio track in the multi-track input;

(h) identifying a third one of said first plurality of said labels corresponding to the second measured amplitude; and (i) creating a second line connecting the first one of said first plurality of said labels and the third one of said first plurality of said labels, wherein:

(1) the second line is the first color if the reference amplitude and the second measured amplitude are separated by the first amplitude increment;

(2) the second line is the second color if the reference amplitude and the second measured amplitude are separated by a first multiple of the first amplitude increment;

(3) the second line is the third color if the reference amplitude and the second measured amplitude are separated by a second multiple of the first amplitude increment;

(4) the second line is the fourth color if the reference amplitude and the second measured amplitude are separated by a third multiple of the first amplitude increment;

(5) the second line is the fifth color if the reference amplitude and the second measured amplitude are separated by a fourth multiple of the first amplitude increment; and (6) the second line is the sixth color if the reference amplitude and the second measured amplitude are separated by a fifth multiple of the first amplitude increment.

* * * * *